US009389891B2

(12) United States Patent
Battagin et al.

(10) Patent No.: US 9,389,891 B2
(45) Date of Patent: Jul. 12, 2016

(54) CUSTOM BROWSER-SIDE SPREADSHEET FUNCTIONS (75) Inventors: Daniel C. Battagin, Bellevue, WA (US); Shahar Prish, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 83 days.

(21) Appl. No.: 13/345,757

(22) Filed: Jan. 9, 2012

(65) Prior Publication Data

US 2013/0179764 A1 Jul. 11, 2013

(51) Int. Cl.
*G06F 9/455* (2006.01)
*G06F 17/30* (2006.01)
*G06F 17/24* (2006.01)

(52) U.S. Cl.
CPC .......... *G06F 9/45529* (2013.01); *G06F 17/246* (2013.01); *G06F 17/30896* (2013.01)

(58) Field of Classification Search
CPC ..................................... G06F 17/246
USPC ......................................... 715/209
See application file for complete search history.

(56) References Cited

U.S. PATENT DOCUMENTS

| | | | |
|---|---|---|---|
| 6,377,288 B1 * | 4/2002 | Moran et al. .................. | 715/863 |
| 6,988,241 B1 * | 1/2006 | Guttman et al. ............... | 715/220 |
| 7,047,484 B1 * | 5/2006 | Becker et al. ................. | 715/201 |
| 7,266,763 B2 | 9/2007 | Peyton-Jones et al. | |
| 7,523,395 B1 | 4/2009 | Namait et al. | |
| 8,239,751 B1 * | 8/2012 | Rochelle et al. .............. | 715/220 |
| 2004/0044954 A1 * | 3/2004 | Hosea ........................... | 715/503 |
| 2004/0181748 A1 | 9/2004 | Jamshidi et al. | |
| 2006/0036939 A1 | 2/2006 | Hobbs et al. | |
| 2007/0233811 A1 | 10/2007 | Rochelle et al. | |
| 2009/0113388 A1 | 4/2009 | Lindhorst | |

(Continued)

FOREIGN PATENT DOCUMENTS

| | | |
|---|---|---|
| CN | 1734448 A | 2/2006 |
| CN | 101650712 A | 2/2010 |
| EP | 1603053 A2 | 12/2005 |

OTHER PUBLICATIONS

International Search Report and Written Opinion of the International Searching Authority regarding International Application No. PCT/US2013/020441 dated Apr. 29, 2013, 9 pages.

(Continued)

*Primary Examiner* — Kavita Padmanabhan
*Assistant Examiner* — Tionna Burke
(74) *Attorney, Agent, or Firm* — Damon Rieth; Tom Wong; Micky Minhas (57) ABSTRACT Architecture that enables the capability to call user-defined functions (UDFs) within the hosting page, and from within a spreadsheet. UDFs can be used to add functionality to spreadsheet models. Spreadsheet calculations are spread across a backend calculation server and the web browser. Spreadsheet calculation state is maintained as browser functions are calculated. Moreover, the browser UDFs can be executed synchronously or asynchronously. The architecture also provides capability to dynamically register/unregister UDFs at runtime, which can then be called from the spreadsheet model and executed remotely), and the capability to define a manifest that can include all of the UDF definitions, infinite calculation loop situations are also prevented. The UDFs have full access to the page DOM (document object model).

20 Claims, 8 Drawing Sheets (56) References Cited

U.S. PATENT DOCUMENTS

2009/0271693 A1    10/2009  Rae et al.
2010/0211862 A1     8/2010  Parish et al.
2011/0307859 A1*   12/2011  Hagenlocher et al. ........ 717/106

OTHER PUBLICATIONS

Jacobsson, ".NET Development for the web Using Microsoft Office Sharepoint Server 2007 and ASP.NET", Master of Science Thesis in Software Engineering and Technology, Department of Computer Science and Engineering, Chalmers University of Technology, University of Gothenburg, Dec. 2009, retrieved from <<http://publications.lib.chalmers.se/records/fulltext/118608.pdf>>, 52 pages.

Obrenović et al., "End User Service Computing: Spreadsheets as a Service Composition Tool", IEEE Transactions on Services Computing, vol. 1, No. 4, Oct.-Dec. 2008, 14 pages.

Shalom, et al., "High-Performance Excel-Based Applications in Financial Services", Microsoft Developer Network, retrieved from <<http://msdn.microsoft.com/en-us/library/bb887539.aspx>>, Aug. 2007, 14 pages.

"Error Handling", Excel VBA—Reference Guide, Excel-Spreadsheet.com, retrieved from <<http://www.excel-spreadsheet.com/vba/errorhandling.htm>>, Aug. 2010, 3 pages.

"First Office Action and Search Report Issued in Chinese Patent Application No. 201380005102.6", Mailed Date: Dec. 14, 2015, 11 Pages.

Extended European Search Report Received in European Patent Application No. 13736143.2, Mailed Date: Jul. 14, 2015, 8 pages.

* cited by examiner

CUSTOM BROWSER-SIDE SPREADSHEET FUNCTIONS

BACKGROUND

When building a solution around a spreadsheet model, it is often necessary to provide functionality beyond the functionality built into the spreadsheet application. This is particularly applicable to network-based services where there may be fewer features, However, providing for extensibility in network-based services is complicated. For example, the actual calculation service may be secure, and unlike the personal computer running the spreadsheet application locally, the network-based service is rarely "owned" by the user creating/running a workbook (or other type of file format) model. Consequently, it is generally infeasible to run end-user code as part of a model due to reliability and security concerns of the overall service.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture employs user-defined functions (UNFs) to overcome existing limitations by running custom functionality UDFs in the context of the web browser, on the user's personal computer. Accordingly, the UDFs do not pose the same reliability and security concerns for the backend service, while still enabling solution customization by the author (assuming that the author can write-control the content of the webpage that hosts the runtime representation of the file, e.g., a workbook).

Generally, the architecture provides the ability to call functions within the hosting page, from within a spreadsheet, spreads spreadsheet calculation across a backend calculation server and the web browser, maintains spreadsheet calculation state as browser functions are calculated, and provides the ability to either synchronously or asynchronously execute browser UDFs. Additionally, the architecture provides the ability to dynamically register/unregister UDFs at runtime, which can then be called from the spreadsheet model (but execute remotely), the ability to define a manifest that can include all of the UDF definitions, and prevents infinite-catc-loop situations.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture enables the ability to call functions (UDFs—user-defined functions) within the hosting page, and from within a spreadsheet hosted in the webpage. UDFs can he used to add functionality to spreadsheet models. Spreadsheet calculations are spread across a backend calculation server and the web browser. Spreadsheet calculation state is maintained as browser functions are calculated. Moreover, the browser UDFs can be executed synchronously or asynchronously. The architecture also provides capability to dynamically register/unregister UDFs at runtime, which can then be called from the spreadsheet model (and executed remotely), and the capability to define a manifest that can include all of the UDF definitions. Infinite calculation loop situations are also prevented. The UDFs may have full access to the webpage DOM (document object model), as well as any other resources that are made available to it by the spreadsheet runtime environment (these resources may not exist on the containing webpage).

User-defined functions JavaScript™) are UDFs that can be authored by a webpage author, and called by a spreadsheet file format, such as a workbook, hosted in the same page. (Hereinafter, the file format is referred to as a workbook; however, it is to be understood that the description applies generally to any file formats that may be employed as part of the spreadsheet,) The UDFs enable the same type of extensibility as other spreadsheet UDFs (e.g., calculation, external data, etc.), but are targeted at web-style scenarios, since the UDFs rely on the webpage context for implementation.

Since JavaScript UDFs are implemented (the bodies are contained) in a webpage and not in the workbook, the UDFs are callable from workbooks that are embedded in pages (e.g., via div syndication (also referred to as div embedding); the div an HTML (hypertext markup language) tag).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
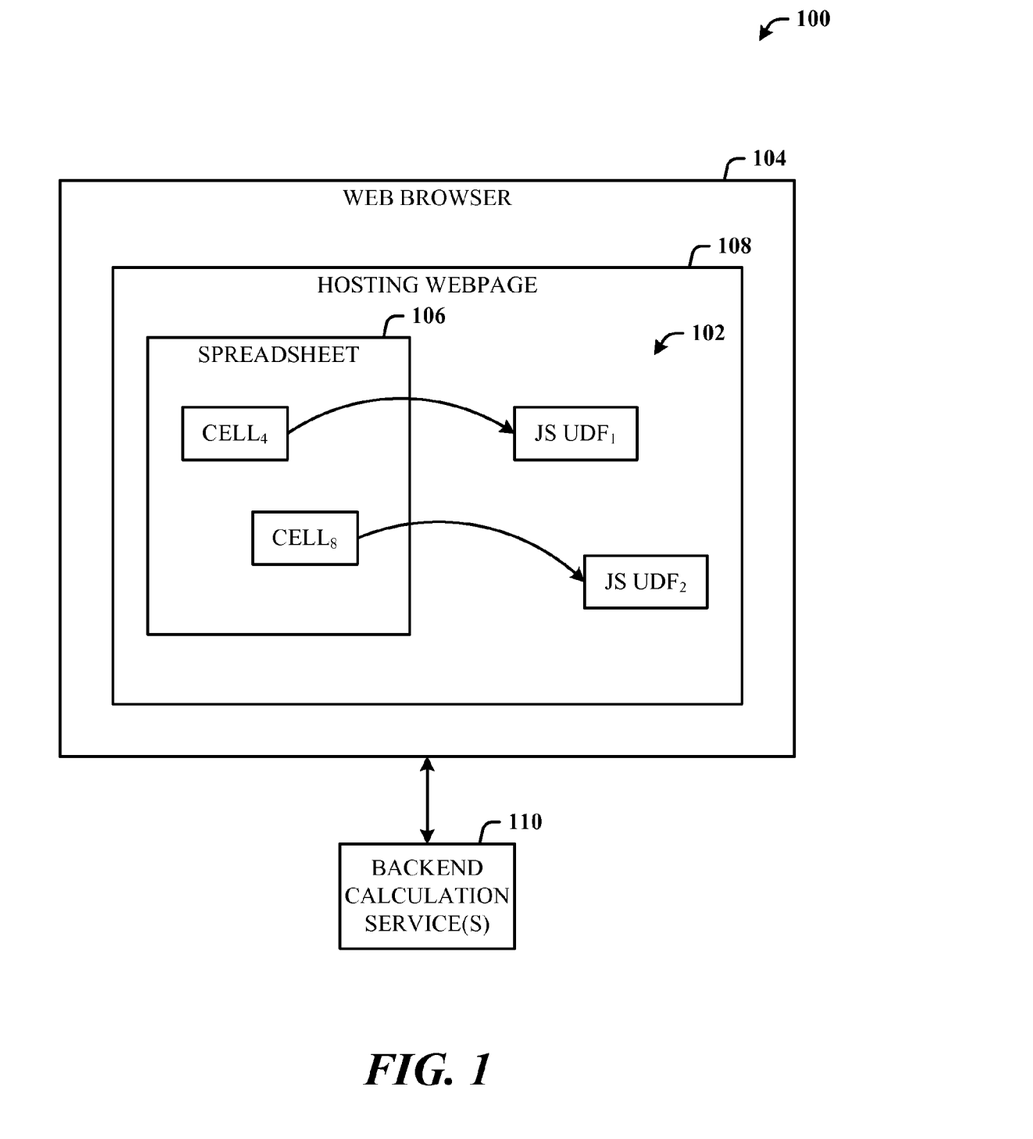
FIG. 1 illustrates a system in accordance with the disclosed architecture.
Figure 2:
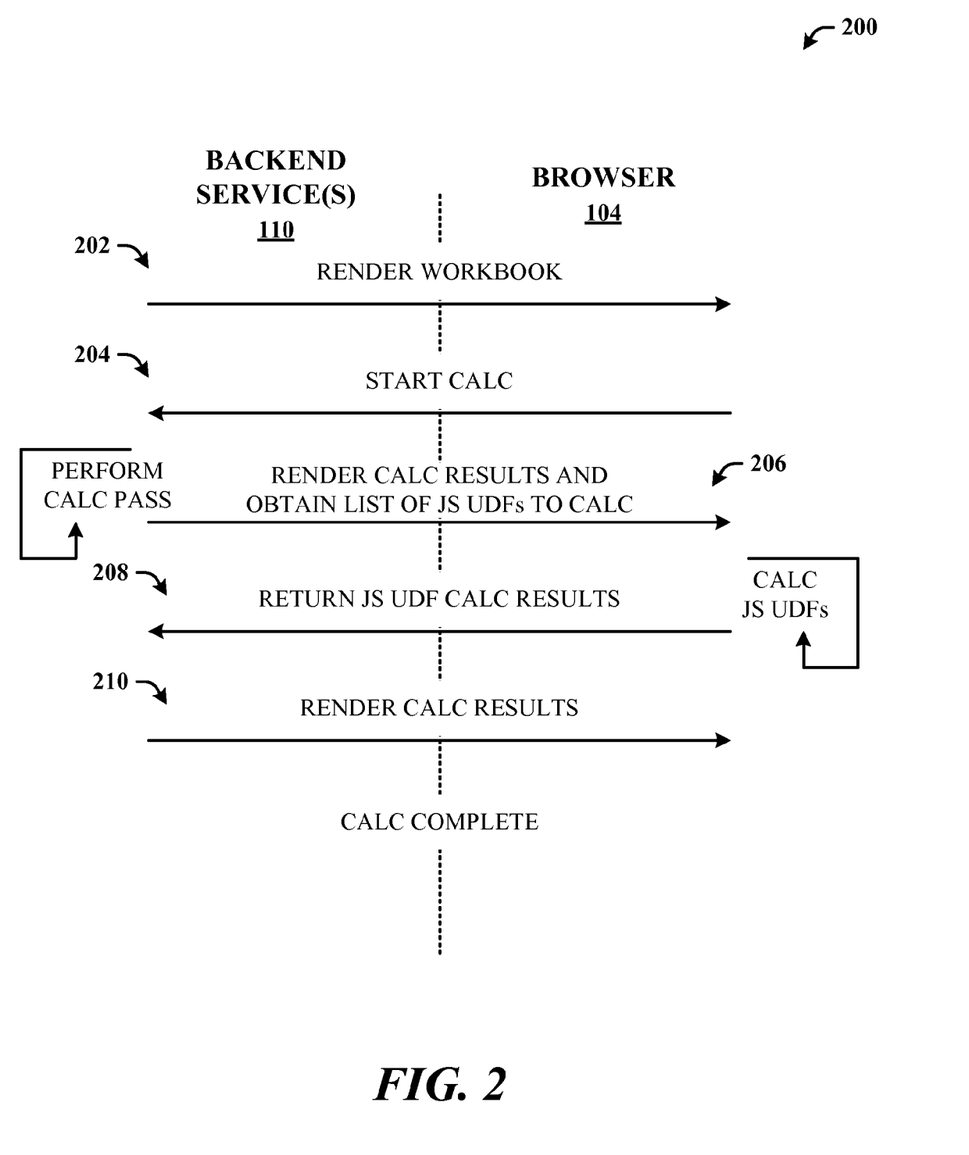
FIG. 2 illustrates a flow diagram between the backend calculation service and the client-side browser.

FIG. 1 illustrates a system 100 in accordance with the disclosed architecture. The system 100 can include user-defined functions 102 that run in context of a web browser 104 of a client device. The user-defined functions 102 are callable from a spreadsheet 106 hosted in a webpage 108 accessed via the web browser 104. The user-defined functions 102 are written according to a scripting language JavaScript). The web browser 104 and a backend calculation service 110 share spreadsheet calculations of the user-defined functions 102. As the user-defined functions 102 are calculated, spreadsheet calculation state is maintained. The user-defined functions 102 can be executed synchronously or asynchronously. The user-defined functions 102 can be dynamically registered and unregistered at runtime. The user-defined functions 102 can be listed in and loaded from a manifest. The spreadsheet 106 is embedded in the webpage 108 based on div syndication, FIG. 2 illustrates a flow diagram 200 between the backend calculation service 110 and the client-side browser 104. This general flow is described in the context of employing the spreadsheet calculation service 110 (e.g., Excel Services™, which can include an Excel Calculation Service (ECS)) and a web front end for rendering an Excel file format, referred to as a workbook. Excel Services can use an asynchronous model to calculate JavaScript UDFs.

Flow begins at 202 with the user on the client side accessing a webpage to cause the service 110 to render a workbook via the browser 104. At 204, a Calc Operation begins (e.g., via edit, refresh, etc.) from the browser 1104 (via which is accessed an Excel web application—EWA) to the service 110, with the service 110 calculating as much of the calculation chain as it can (performing the calc pass). As the service 110 encounters JavaScript UDFs (denoted as JS UDFs) that need to be calculated (e.g., due to changed parameters or because the UDFs are volatile), at 206, the JavaScript UDFs are added to a list of functions to calculate in the browser 104.

Once no more dependencies can be calculated by the service 110, the "semi-calced" results are sent back to EWA in the browser 104, along with the list of the JavaScript UDFs to calculate in the browser 104. The browser 104 calculates the JavaScript UDFs. The browser 104 (via EWA) initiates calculation (e.g., serially) of each of the JavaScript UDFs in the following order: asynchronous JavaScript UDFs followed by synchronous JavaScript UDFs, At 208, once all JavaScript UDFs are calculated, the results are returned to service 110, to be inserted into the calc chain, and calculation is restarted, with returned values. At 210, the calc results are rendered in the browser 104 (EWA thereof).

Figure 3:
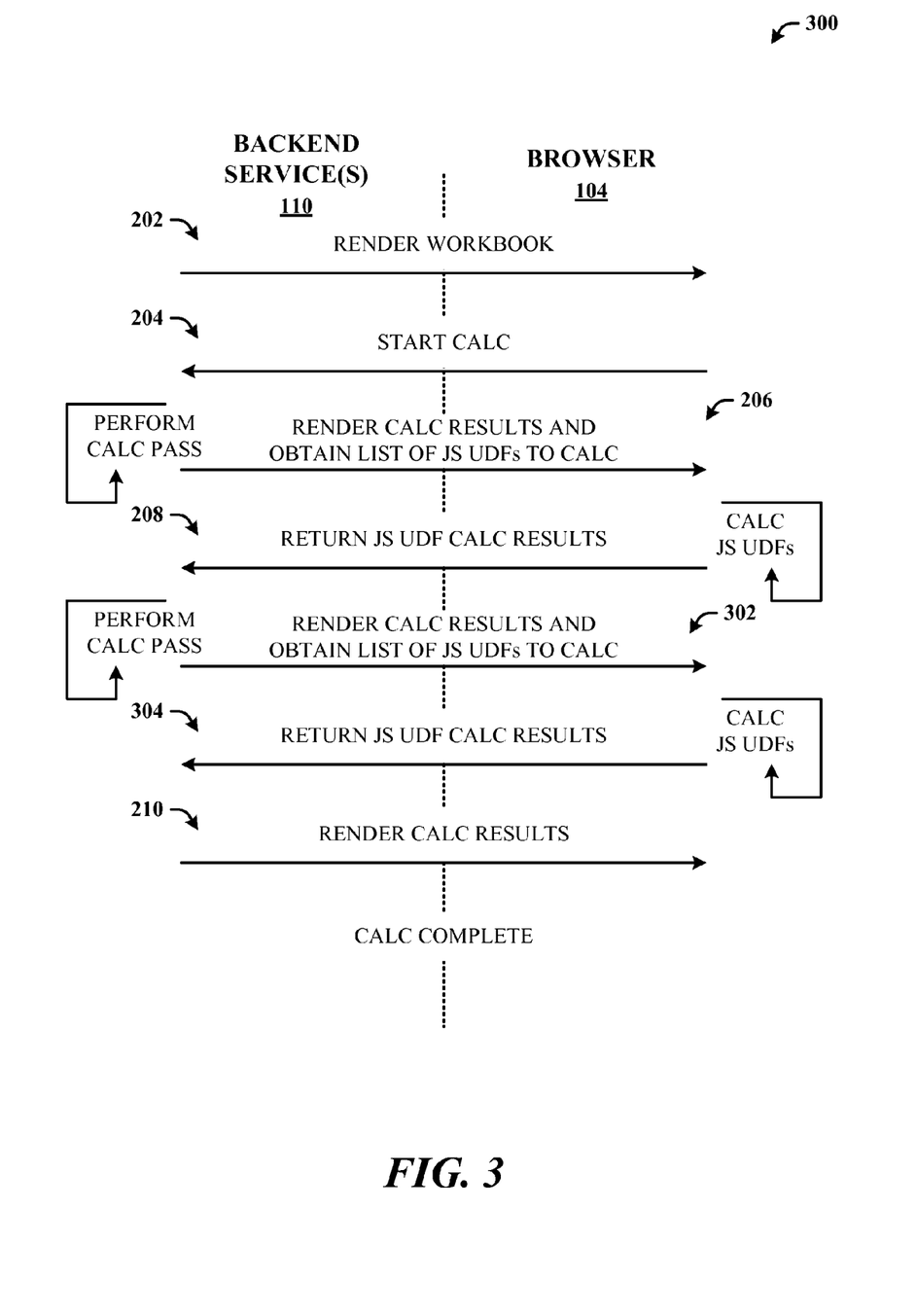
FIG. 3 illustrates an alternative flow diagram between the backend calculation service and the client-side browser.

FIG. 3 illustrates an alternative flow diagram 300 between the backend calculation service 110 and the client-side browser 104. The hand-off between the service 110 and the browser 104 can be configured to occur a predetermined number of times (e.g., five) during a single Calc Operation, to prevent an infinite calculation scenario. Accordingly, at 302, rather than moving to 210 to render the calc results in the previous flow diagram 200, a second or additional calc passes can be performed, following step 208. Once the service 110 determines that all dependencies have been calculated and cafe is complete or the service 110 has reached the loop count limit, the service 110 notifies the EWA (of the browser 104) that the Calc Operation is complete. At 302, the calc results are rendered in the browser 104 (EWA thereof). This continues until the loop limit is reached. At 304, the JavaScript UDFs are returned to the EWA in the browser 104, and at 210, the calc results are rendered in the browser 104 (EWA thereof).

During a Calc Operation, the user can be notified of the pending calculation by setting the value of the cell to a value such as #GETTING_DATA. JavaScript UDFs that are uncalculated due to hitting the loop limit are left in a #GETTING_DATA state.

Since Calc is restarted on the server (the service 110) after each round of calculating JS UDFs in the browser 104, workbooks that use iterative calculation may appear to have gone through an iteration for each round of IS UDF calculation.

The EWA will not block user interaction due to a Calc Operation. Any user operation that changes the model before an entire Calc Operation is complete will abort the current Calc Operation and restart it from the beginning Values returned by asynchronous JavaScript UDFs for an aborted Calc Operation will be ignored. JavaScript UDFs that are synchronous can effectively block user interaction during the portion of the calc operation during which JavaScript UDFs are being calculated, since the JavaScript may cause the browser to block. The JavaScript UDFs recalculate identically in all calculation modes (e.g., automatic, manual, etc.). When calculation is invoked, all JavaScript UDFs are recalculated, regardless of state.

In one exemplary scenario, a user can provide "everywhere" access to a workbook through a browser using functionality typically obtained from a website for stock quotes. In this example, the user can copy and paste a portion of the JavaScript, as well as obtain the embedded code for the user's workbook. Thereafter, the user is able to enter formulas in the workbook and stock quotes, for example, start showing up in realtime. The Java-Script pasted into the browser page to make this work can look like the following:

```
<script language="JavaScript">
function StockInfo(symbol, measure) {
    var req = new XMLHttpRequest( );
    req.open('GET', 'http://www.contoso-stock-quotes.com/quote/' + symbol + '/' + measure, false);
    req.send(null);
    if (req status == 200) {
        return req.responseText;
    } else {
        throw new Error(ExcelCalcError.Value);
    }
ewa.BrowserUdfs.add("StockQuote",
        StockInfo,
        "Gets a stock quote given a security symbol and measure to return."
        false,
        false
        );
</script>
```

In another example scenario, the user uses a spreadsheet workbook to track real estate properties of interest. Rather than continually copy/pasting addresses into mapping sites in order to see where properties are located, the user embeds the workbook and map component embedded in a page, and employs a JavaScript UDF to asynchronously create a pinpoint for each property on the map and return the latitude and longitude of the pinpoint.

The JavaScript pasted into the browser page to make this work can look like the following:

```
<script language="JavaScript">
function MapAddress(context, address) {
    myMap.Find(null,           // what
        address,               // where
        null,                  // VEFindType (always
VEFindType.Businesses)
        null,                  // VEShapeLayer (base by default.)
        null,                  // start index for results (0 by
default)
        null,                  // max number of results (default is
10)
        null,                  // show results? (default is true)
        null,                  // create pushpin for what results?
(ignored since what is null)
        null,                  // use default disambiguation?
(default is true)
        null,                  // set best map view? (default is
true)
        function (shapeLayer, find-Results, places, moreResults,
```

-continued

```
errorMsg) {
        context.setResult(GeocodeCallback(shapeLayer,
findResults, places, moreResults, errorMsg));
        }                       // call back function
    );
}
function GeocodeCallback (shapeLayer, findResults, places,
moreResults, errorMsg) {
    // if there are no results, display any error message and return
    if(places == null) {
       return;
    }
    var bestPlace = places[0];
    // Add pushpin to the *best* place
    var location = bestPlace.LatLong;
    var newShape = new VEShape(VEShapeType.Pushpin, location);
    var desc = "Latitude: " + location.Latitude + "<br>Longitude:" +
location.Longitude;
    newShape.SetDescription(desc);
    newShape.SetTitle(bestPlace.Name);
    myMap.AddShape(newShape);
    return bestPlace.LatLong;
}
ewa.BrowserUdfs.add("MapAddress",
        MapAddress,
        "Place a pin on a bing map, and returns the
bing lat/long of the point."
        true,
        false
        );
myMap = new VEMap ("mapDiv");
myMap.LoadMap( );
</script>
```

In a simple calculation user example, the user can employ common "utility" functions routinely used in many of the user workbooks, and that are not built into the spreadsheet application. Using JavaScript UDFs, the user can provide simple function bodies for workbooks in the user's custom webpage. Thus, the user can now use workbooks that contain UDFs in the web browser, in addition to using the workbooks in the spreadsheet application. The user does not need to change the workbook itself to make this work, as long as the user uses the same function names.

The JavaScript pasted into the browser page to make this work can look like the following:

```
<script language="JavaScript">
function encodeUrl(url) {
    return encodeURI(url);
}
ewa.BrowserUdts.add("EncodeURL",
        encodeUrl,
        "Encodes a URL - replacing special characters
with their UTF-8 encoding.",
        false,
        false
        );
</script>
```

Alternatively, the functionality can be implemented according to the following:

```
<scriptlanguage="JavaScript">
ewa.BrowserUdfs.add("EncodeURL",
        function(url) { return encodeURI(url)},
        "Encodes a URL - replacing special characters
with their UTF-8 encoding.",
        false,
        false
        );
</script>
```

Following is a detailed description of one possible specific implementation, described in terms of utilizing the Excel spreadsheet and Excel web application. However, it is not to be construed as limiting in any way, as the disclosed architecture can be employed differently in this Excel spreadsheet/web application context, as well as outside the Excel environment altogether.

JavaScript UDFs can be registered and unregistered using JavaScript. Including an ewa.js in a page exposes a new method called getBrowserUdfs( ) on the Ewa.EwaControl object defined by the EWA JavaScript OM (object model).

BrowserUdfs getBrowserUdfs( )

| Parameter | "Type" | |
|---|---|---|
| <return value> | BrowserUdfs | BrowserUdfs object, used to work with browser UDFs. |

The BrowserUdfs object can have the following methods:

| Method | |
|---|---|
| add(udfName, udfFunc, description, isVolatile, isAsync) | Registers a browser UDF |
| exists(udfName) | Returns true if a browser UDF is registered |
| remove(udfName) | Unregisters a browser UDF |
| removeAll( ) | Unregisters all browser UDFs |

These methods can have the following properties:

boolean add(udfName, udfFunc, description, isVolatile, isAsync)

| Parameter | "Type" | Notes |
|---|---|---|
| udfName | string | The name of the method as it appears in formula autocomplete. If a JavaScript UDF with udfName is already registered, it will be replaced. udfName is a valid Excel function name. |
| udfFunc | string | The function that implements the JavaScript UDF. This can also be the entire function body, if the author so chooses. If a function with this name does not exist when add is called, the add method returns false. |
| description | string | A description of the function. |
| isVolatile | boolean | true if the function should be calculated on every calc operation, regardless of input values changing. Otherwise, false. Default: false. |
| isAsync | boolean | true if the JavaScript UDF is going to run asynchronously, and will need to return a value through a callback method. Otherwise, false. Default: false. When isAsync equals true, the first parameter to the implementation of udfFunc is a context parameter. |
| <return value> | boolean | true if the function was successfully registered. Otherwise, false. | boolean exists (udfName)

| Parameter | "Type" | Notes |
|---|---|---|
| udfName | string | The name of the method as it appears in formula autocomplete. |
| <return value> | boolean | true if the function was successfully registered. Otherwise, false. | boolean remove (udfName)

| Parameter | "Type" | |
|---|---|---|
| udfName | string | The name of the JavaScript UDF to be unregistered. |
| <return value> | boolean | true if the function is not registered after calling this method. Otherwise, false. | void removeAll( )

| Parameter | "Type" | |
|---|---|---|
| <return value> | void | No JavaScript UDFs are registered after calling this method. |

There is no need for automatic recalculation after calling any of these methods. After registering or unregistering JavaScript UDFs, a call can be made to the EWA JavaScript OM to calculate the workbook. This triggers Calc, which then triggers execution of JavaScript UDFs. There is no need for automatic recalculation after registration/unregistration.

Functions can be registered into the model/calc space in the following order by Excel Services: built-in functions, Excel calculation services (ECS) UDFs, and then JavaScript UDFs. Each JavaScript UDF is registered with a unique udfName across all functions in the Excel model. If the user registers a JavaScript UDF with the same (as determined by ECS function comparison logic) udfName as a built-in function or ECS UDF, registration succeeds, but the existing function takes precedence. If the user registers a JavaScript UDF with the same udfName as an existing JavaScript UDF, the new JavaScript UDF replaces the existing JavaScript UDF.

JavaScript UDFs that have been registered via BrowseUdfs.add are displayed in formula autocomplete the next time it is shown. JavaScript UDFs that have been unregistered via BrowserUdfs.remove are not displayed in formula autocomplete the next time it is shown.

JavaScript UDF resolution is attempted only after a JavaScript UDF is registered and calculation occurs. Prior thereto, ECS can return #NAME? for any unrecognized function and does not attempt calculation of the function, even if the function implementation is contained in the host page.

JavaScript UDFs are supported in all modes of EWA that are supported by div embedded embedding. The EWA is embedded in a page that contains the JavaScript UDF definitions in order to execute. These triodes include, but are not limited to, a view mode and a scratchpad mode.

JavaScript UDFs evaluate to #NAME? in single-user and collaborative sessions. Calling the BrowserUdfs.add method when EWA is in an edit session returns false.

With respect to parameter and return values, Excel Services can converts values passed to JavaScript UDFs and returns values from JavaScript UDFs using the following conventions:

| Excel Type | JavaScript Type |
|---|---|
| Number | Number |
| String | String |
| Boolean | Boolean |
| Error | not allowed |
| Missing | Undefined |
| Nil | Null |
| 2D Array | 2D Array |

When a range is passed to a JavaScript UDF, Excel Services converts that range to an array of values prior to passing it to the JavaScript UDF, rather than passing an actual Range object.

With respect to the JavaScript UDF runtime environment, JavaScript UDFs run in the web browser JavaScript environment, and are largely, but not entirely, unrestricted (that is, the JS UDFs can do anything that the JavaScript runtime allows). JS UDFs can do the following: access the DOM of the page that contains the embedded (via div embedded) EWA, and use an XMLHTTP object to make HTTP requests (to get data from other locations not embedded on the page).

JavaScript UDFs can perform work synchronously or asynchronously before returning a value. JavaScript UDFs that run asynchronously set the isAsync parameter to true when registered with BrowserUdfs.add, and define the first parameter of the UDF (specified by the udfFunc parameter) to be a context parameter. This context parameter is used by the UDF to return a value to Excel Services, as defined below.

Upon registering an asynchronous JavaScript UDF, Excel Services sets the context parameter on the UDF to an xlAsyncBrowserUdfContext object. This object has the following attributes:

| Property | "Type" | Value |
|---|---|---|
| setResult | method | The value to be placed in the cell/used in the formula as the result of the JavaScript UDF. The Excel "data type" of result is determined using the same algorithm as user-entered data in a cell. |

If the developer uses the this object in a JavaScript UDF, this will be in the global (JavaScript page) scope.

Inclusion of JavaScript UDFs in a workbook, and evaluation of JavaScript UDFs as part of a page does not cause any prompts to be shown to the user about running custom code.

The results of a JavaScript UDF call can be cached through the duration of a Calc Operation. Any other instances of the JavaScript UDF that have the same inputs can use the value from the cache, rather than being individually calculated.

The implementation of JavaScript UDFs is not persisted in the workbook that calls them; however, the formulas that include a call to the JavaScript UDFs are persisted/round-tripped like any other formula. The UDF call in these formulas is persisted in the same fashion as a VBA (Visual Basic for applications) UDF that is stored in the same workbook (that is, the call is persisted "unadorned," as just the function call). In this persistence methodology, the user can provide an implementation of the UDF on the client side via embedded VBA, XLAM (an Excel add-in file type), COM (component object model), XLL (Excel add-ins extension), etc., such that the UDF works in Excel as well, though the implementations would be different. JavaScript UDFs can be persisted in any file format that can be saved by Excel Services (e,g., XLSX (open architecture XML spreadsheet), M, B).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
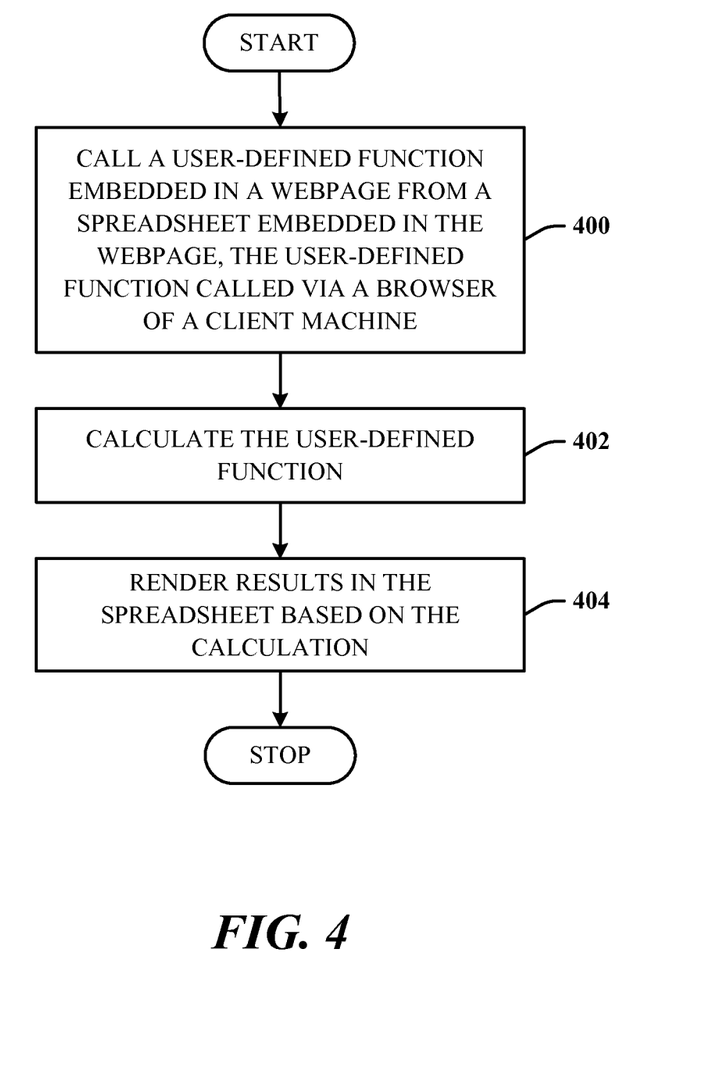
FIG. 4 illustrates a method in accordance with the disclosed architecture.
Figure 5:
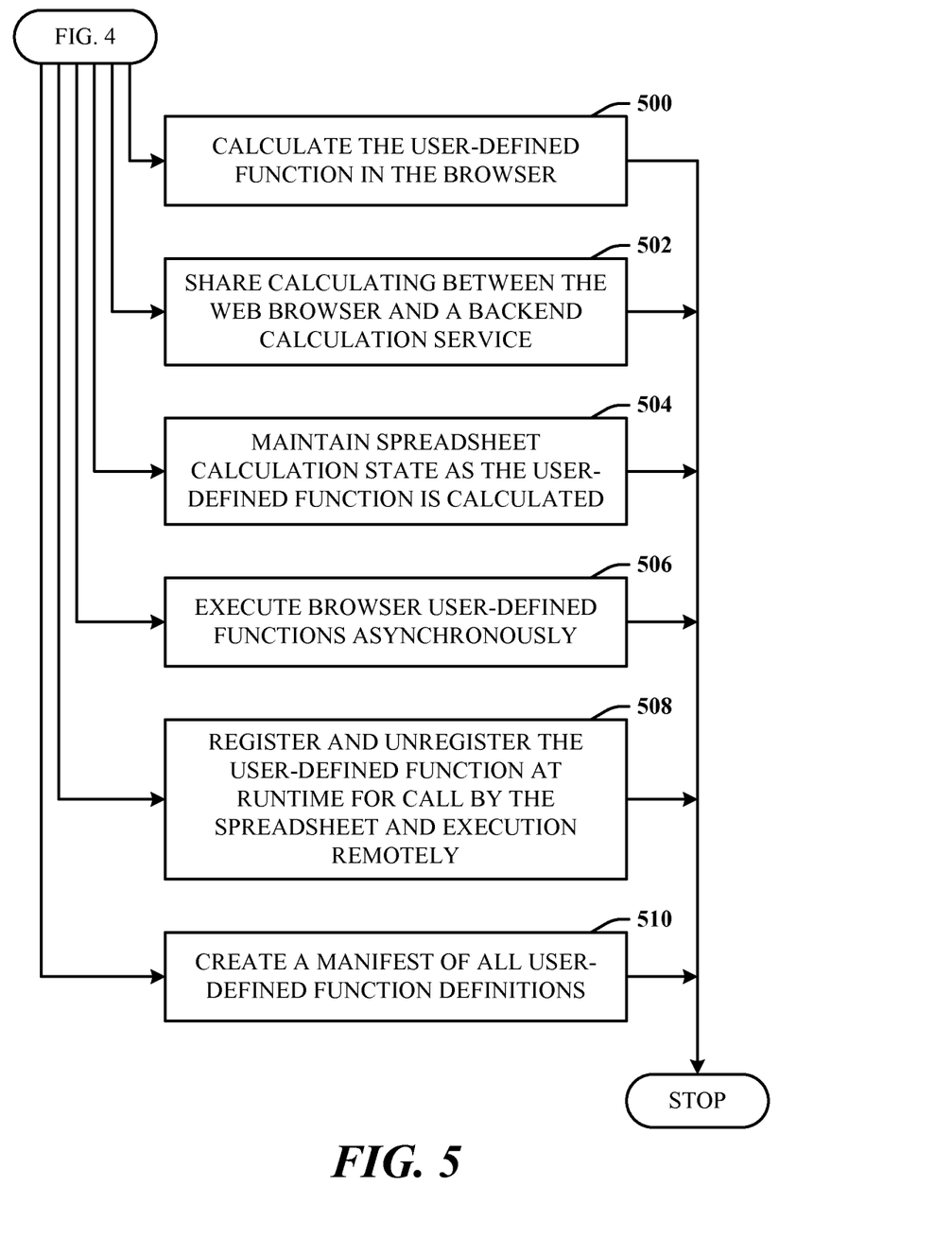
FIG. 5 illustrates further aspects of the method of FIG. 4.

FIG. 4 illustrates a method in accordance with the disclosed architecture. At 400, a user-defined function embedded in a webpage is called from a spreadsheet embedded in the webpage. The user-defined function is called via a browser of a client machine. At 402, the user-defined function is calculated. At 404, results are rendered in the spreadsheet based on the calculation, FIG. 5 illustrates further aspects of the method of FIG. 4. Note that the flow indicates that each block can represent a step that can be included, separately or in combination with other blocks, as additional aspects of the method represented by the flow chart of FIG. 4. At 500, the user-defined function is calculated in the browser. At 502, the calculating is shared between the web browser and a backend calculation service. At 504, spreadsheet calculation state is maintained as the user-defined function is calculated. At 506, browser user-defined functions are executed asynchronously. At 508, the user-defined function is registered and unregistered at runtime for call by the spreadsheet and execution remotely. At 510, a manifest of all user-defined function definitions is created. The manifest is a way to define a group/set of browser UDFs that get registered/unregistered as a set. It generally can be used anytime the user is going to register/unregister that set of UDFs individually, as a convenience.

Figure 6:
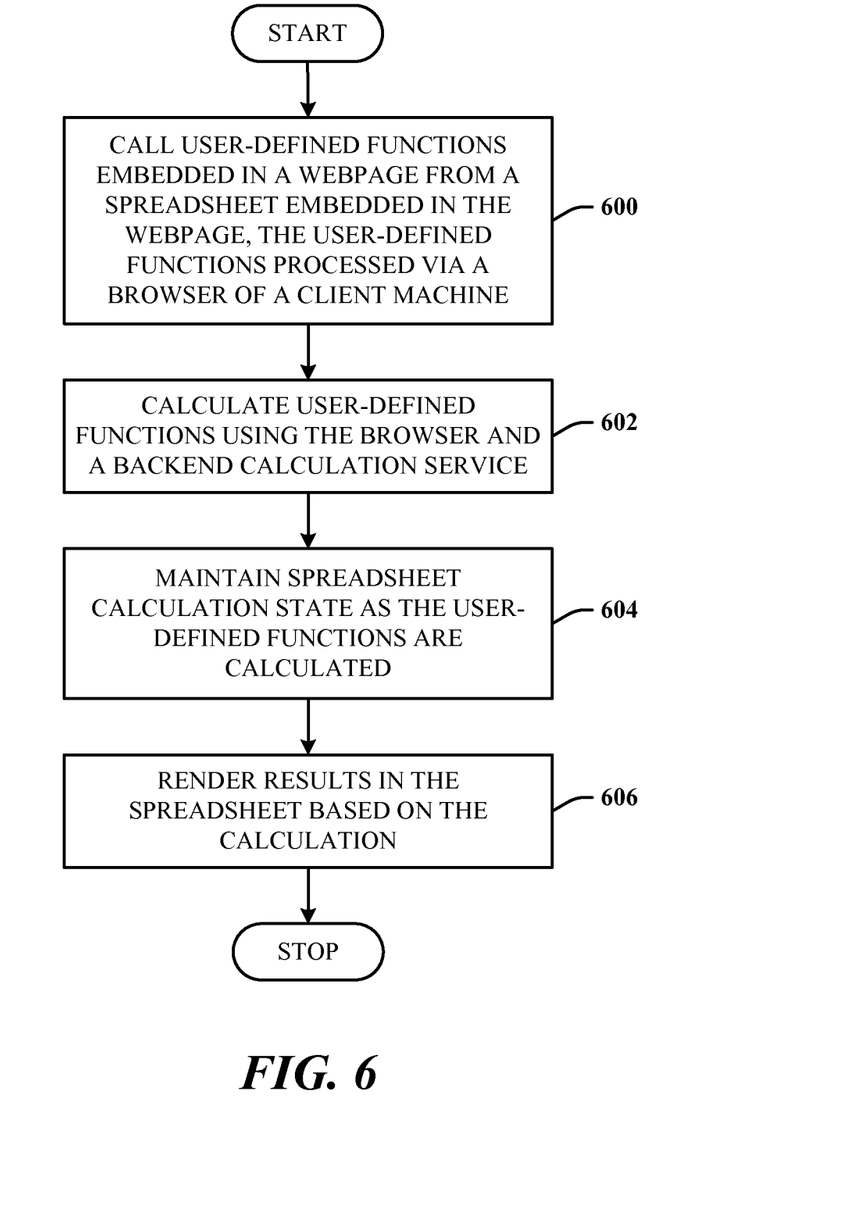
FIG. 6 illustrates an alternative method in accordance with the disclosed architecture.

FIG. 6 illustrates an alternative method in accordance with the disclosed architecture. At 600, user-defined functions embedded in a webpage are called from a spreadsheet embedded in the webpage. The user-defined functions are processed via a browser of a client machine. At 602, the user-defined functions are calculated using the browser and a backend calculation service. At 604, spreadsheet calculation state is maintained as the user-defined functions are calculated. At 606, results are rendered in the spreadsheet based on the calculation.

Figure 7:
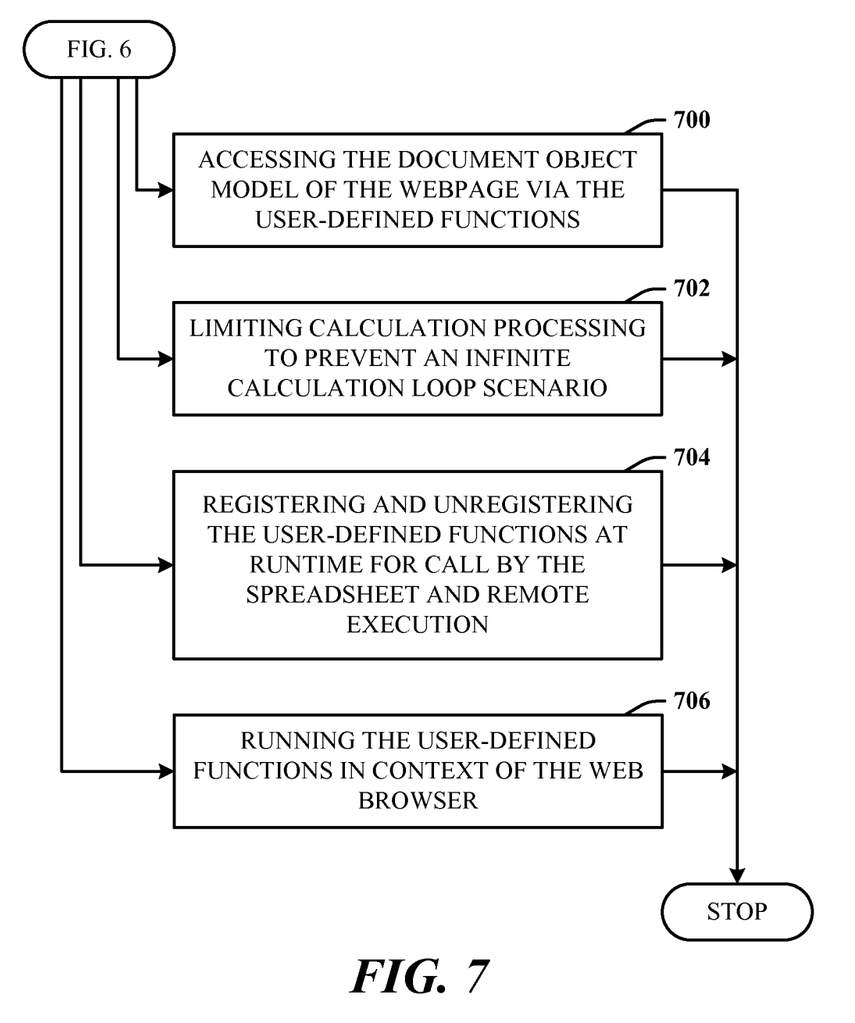
FIG. 7 illustrates further aspects of the method of FIG. 6.

FIG. 7 illustrates further aspects of the method of FIG. 6. Note that the flow indicates that each block can represent a step that can be included, separately or in combination with other blocks, as additional aspects of the method represented by the flow chart of FIG. 6. At 700, the document object model of the webpage is accessed via the user-defined functions. At 702, calculation processing is limited to prevent an infinite calculation loop scenario. At 704, the user-defined functions are registered and unregistered at runtime for call by the spreadsheet and remote execution. At 706, the user-defined functions are run in context of the web browser.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs, Referring now to FIG. 8, there is illustrated a block diagram of a computing system 800 that executes browser-side user-defined functions in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software, The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

Figure 8:
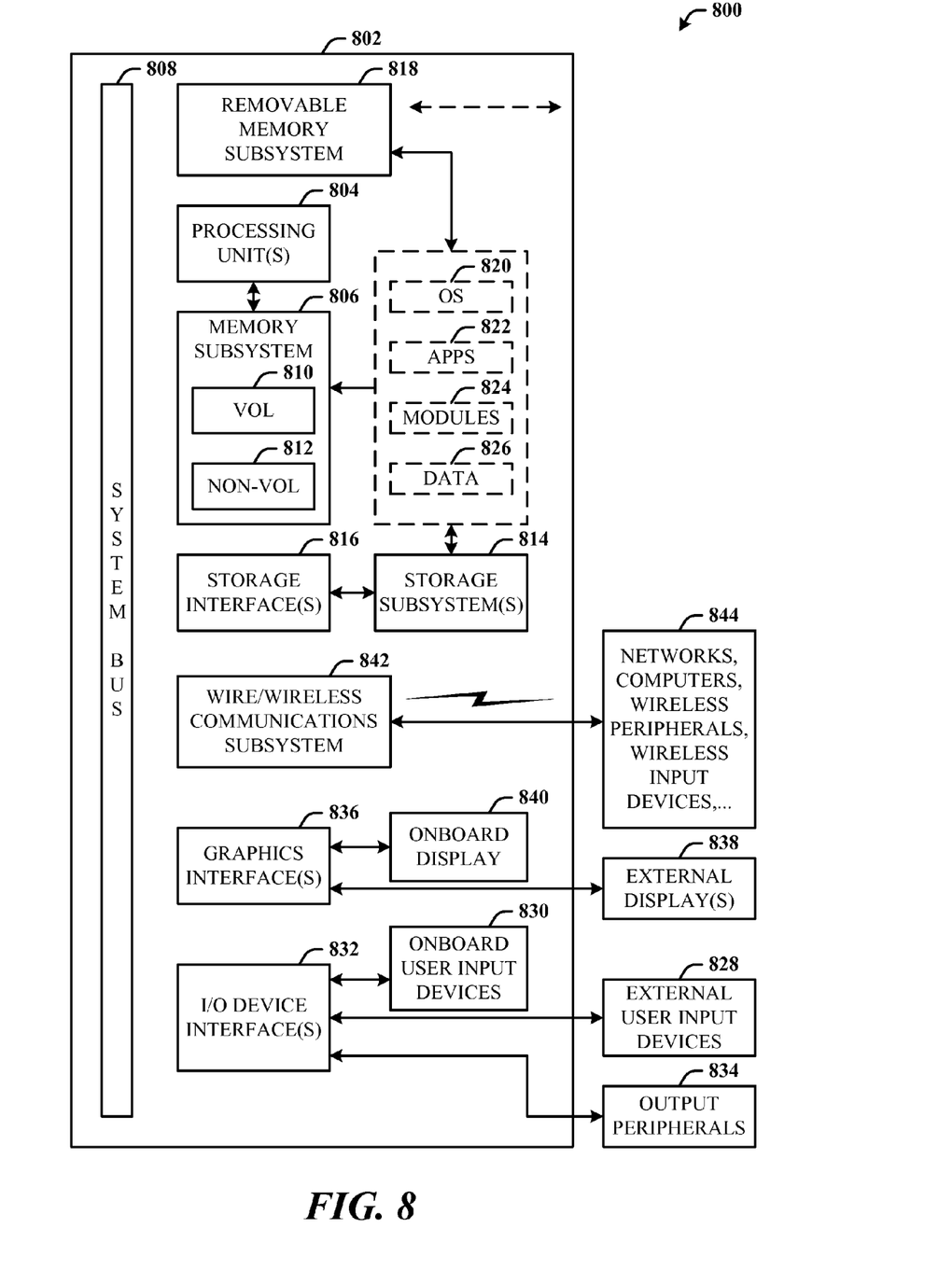
FIG. 8 illustrates a block diagram of a computing system that executes browser-side user-defined functions in accordance with the disclosed architecture.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e,g., optical, magnetic, solid state), including an operating system 820, one or more application programs 822, other program modules 824, and program data 826.

The operating system 820, one or more application programs 822, other program modules 824, and/or program data 826 can include entities and components of the system 100 of FIG. 1, entities and flow of the flow diagram 200 of FIG. 2, entities and flow of the diagram 300 of FIG. 3, and the methods represented by the flowcharts of FIGS. 4-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device; as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity, A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device, comprising:
 a processor configured to execute computer-executable instructions; and
 memory storing computer-executable components that, when executed by the processor, cause the computing device to perform a method comprising:
  rendering, via a web browser of the computing device, a spreadsheet hosted in a backend server, the spreadsheet including built-in functions utilized by a network-based calculation service provided by the backend server to calculate cell values based on data included in the spreadsheet;

embedding, into a web page, one or more user-defined functions for extending functionality of the spreadsheet beyond the built-in functions utilized by the network-based calculation service, wherein the one or more user-defined functions are written according to a scripting language and are callable from the spreadsheet;

sending registration information for the built-in functions included in the spreadsheet and the one or more user-defined functions embedded in the web page to the network-based calculation service at runtime;

instructing, via the web browser, the network-based calculation service to begin a calculation operation that utilizes one or more built-in functions included in the spreadsheet and one or more user-defined functions called from the spreadsheet;

receiving, by the web browser, semi-calculated results from the network-based calculation service and a list identifying each user-defined function called from the spreadsheet that needs to be calculated by the web browser to complete the calculation operation, the semi-calculated results including cell values for dependencies that can be calculated by the network-based calculation service utilizing only the data and built-in functions included in the spreadsheet;

processing, via the web browser, each user-defined function identified in the list;

returning, via the web browser, a value of each processed user-defined function to the network-based calculation service; and rendering, via the web browser, complete calculation results of the calculation operation in the spreadsheet, the complete calculation results including cell values for dependencies calculated by the network-based calculation service utilizing the data and built-in functions included in the spreadsheet and the value of each processed user-defined function.

2. The computing device of claim 1, wherein as each user-defined function identified in the list is processed, spreadsheet calculation state is maintained.

3. The computing device of claim 1, wherein each user-defined function identified in the list is executed synchronously or asynchronously.

4. The computing device of claim 1, wherein the one or more user-defined functions are loaded from a manifest that lists available user-defined functions.

5. The computing device of claim 1, wherein the spreadsheet is embedded in the webpage based on div syndication.

6. A method, comprising:

rendering, via a web browser of a computing device, a spreadsheet hosted in a backend server, the spreadsheet including built-in functions utilized by a network-based calculation service provided by the backend server to calculate cell values based on data included in the spreadsheet;

embedding, into a webpage, one or more user-defined functions for extending functionality of the spreadsheet beyond the built-in functions utilized by the network-based calculation service, wherein the one or more user-defined functions are written according to a scripting language and are callable from the spreadsheet;

sending registration information for the built-in functions included in the spreadsheet and the one or more user-defined functions embedded in the web page to the network-based calculation service at runtime;

instructing, via the web browser, the network-based calculation service to begin a calculation operation that utilizes one or more built-in functions included in the spreadsheet and one or more user-defined functions called from the spreadsheet;

receiving, by the web browser, semi-calculated results from the network-based calculation service and a list identifying each user-defined function called from the spreadsheet that needs to be calculated by the web browser to complete the calculation operation, the semi-calculated results including cell values for dependencies that can be calculated by the network-based calculation service utilizing only the data and built-in functions included in the spreadsheet;

processing, via the web browser, each user-defined function identified in the list;

returning, via the web browser, a value of each processed user-defined function to the network-based calculation service; and rendering, via the web browser, complete calculation results of the calculation operation in the spreadsheet, the complete calculation results including cell values for dependencies calculated by the network-based calculation service utilizing the data and built-in functions included in the spreadsheet and the value of each processed user-defined function.

7. The method of claim 6, wherein spreadsheet calculation state is maintained as each user-defined function identified in the list is processed.

8. The method of claim 6, wherein each user-defined function identified in the list is executed synchronously or asynchronously.

9. The method of claim 6, wherein the one or more user-defined functions are loaded from a manifest that lists available user-defined functions.

10. A computer-readable storage device having memory storing computer-executable instructions that, when executed by a processor of a computing device, cause the computing device to perform a method comprising:

rendering, via a web browser of the computing device, a spreadsheet hosted in a backend server, the spreadsheet including built-in functions utilized by a network-based calculation service provided by the backend server to calculate cell values based on data included in the spreadsheet;

embedding, into a webpage, one or more user-defined functions for extending functionality of the spreadsheet beyond the built-in functions utilized by the network-based calculation service, wherein the one or more user-defined functions are written according to a scripting language and are callable from the spreadsheet;

sending registration information for the built-in functions included in the spreadsheet and the one or more user-defined functions embedded in the web page to the network-based calculation service at runtime;

instructing, via the web browser, the network-based calculation service to begin a calculation operation that utilizes one or more built-in functions included in the spreadsheet and one or more user-defined functions called from the spreadsheet;

receiving, by the web browser, semi-calculated results from the network-based calculation service and a list identifying each user-defined function called from the spreadsheet that needs to be calculated by the web browser to complete the calculation operation, the semi-calculated results including cell values for dependencies that can be calculated by the network-based calculation service utilizing only the data and built-in functions included in the spreadsheet;

processing, via the web browser, each user-defined function identified in the list;

returning, via the web browser, a value of each processed user-defined function to the network-based calculation service; and rendering, via the web browser, complete calculation results of the calculation operation in the spreadsheet, the complete calculation results including cell values for dependencies calculated by the network-based calculation service utilizing the data and built-in functions included in the spreadsheet and the value of each processed user-defined function.

11. The computer-readable storage device of claim 10, wherein each user-define function embedded in the web page has full access to a document object model of the webpage.

12. The computer-readable storage device of claim 10, wherein hand-off between the backend calculation server and the web browser is configured to occur a limited number of times during the calculation operation to prevent an infinite calculation loop scenario.

13. The computer-readable storage device of claim 10, wherein spreadsheet calculation state is maintained as each user-defined function identified in the list is processed.

14. The computer-readable storage device of claim 10, wherein each user-defined function identified in the list is executed synchronously or asynchronously.

15. The computer-readable storage device of claim 10, wherein the one or more user-defined functions are loaded from a manifest that lists available user-defined functions.

16. The computer-readable storage device of claim 10, wherein at least one user-defined function called from the spreadsheet is executed remotely.

17. The computer-readable storage device of claim 16, wherein the at least one user-defined function is executed remotely by a third-party website to obtain a value of the at least one user-defined function.

18. The computing device of claim 1, wherein the network-based calculation service restarts the calculation operation in response to receiving the value of each processed user-defined function from the web browser.

19. The method of claim 6, wherein the network-based calculation service restarts the calculation operation in response to receiving the value of each processed user-defined function from the web browser.

20. The computer-readable storage device of claim 10, wherein the network-based calculation service restarts the calculation operation in response to receiving the value of each processed user-defined function from the web browser.

* * * * *